United States Patent [19]
Horton

[11] Patent Number: 5,309,456
[45] Date of Patent: May 3, 1994

[54] PULSE STRETCHER

[75] Inventor: James A. Horton, Livermore, Calif.

[73] Assignee: The United States of America as represented by the United States Department of Energy, Washington, D.C.

[21] Appl. No.: 968,949

[22] Filed: Oct. 30, 1992

[51] Int. Cl.$^5$ .......................... H01S 3/00; H01S 3/101
[52] U.S. Cl. ........................................ 372/25; 372/700
[58] Field of Search ...................... 372/25, 30, 93, 700

[56] References Cited

U.S. PATENT DOCUMENTS 3,726,598  4/1973  Gilby et al. ........................... 356/244
4,200,846  4/1980  Stark, Jr. et al. ...................... 372/25

OTHER PUBLICATIONS

Chernin and Barskaya, "Optical Multipass Matrix Systems," Applied Optics, vol. 30, No. 1, pp. 51-58, Jan. 1, 1991.

Primary Examiner—Rodney B. Bovernick
Assistant Examiner—Robert McNutt
Attorney, Agent, or Firm—Miguel A. Valdes; Roger S. Gaither; William R. Moser

[57] ABSTRACT

Apparatus (20) for increasing the length of a laser pulse to reduce its peak power without substantial loss in the average power of the pulse. The apparatus (20) uses a White cell (10) having a plurality of optical delay paths (18a-18d) of successively increasing number of passes between the field mirror (13) and the objective mirrors (11 and 12). A pulse (26) from a laser (27) travels through a multi-leg reflective path (28) between a beam splitter (21) and a totally reflective mirror (24) to the laser output (37). The laser pulse (26) is also simultaneously injected through the beam splitter (21) to the input mirrors (14a-14d) of the optical delay paths (18a-18d). The pulses from the output mirrors (16a-16d) of the optical delay paths (18a-18d) go simultaneously to the laser output (37) and to the input mirrors (14b-14d) of the longer optical delay paths. The beam splitter (21) is 50% reflective and 50% transmissive to provide equal attenuation of all of the pulses at the laser output (37).

10 Claims, 3 Drawing Sheets

PULSE STRETCHER

The United States Government has rights to this invention pursuant to Contract No. W-7405-ENG-48 awarded by the United States Department of Energy.

This invention relates to laser pulses and more particularly to apparatus for reducing the peak power of a laser pulse without substantial reduction in the average power of the pulse.

BACKGROUND OF THE INVENTION

There are times when it is desirable to extend the duration of a laser pulse, with the extended pulse having a substantially lower peak power than the original pulse but with substantially the same average power.

One example of such need is the project in which the present invention was made. In particular, this project seeks to improve the ability of ground-based telescopes to observe galaxies and other celestial objects with much greater clarity and with a high resolution that can only be equalled by telescopes in satellites orbiting the earth above the atmosphere.

Approximately 60 miles above the Earth, there is a sodium layer formed by the remnants of tiny meteorites that continually burn out high in the Earth's upper atmosphere. A laser beam, turned to the sodium $D_2$ line at 589 nm and pointed up at a desired point in the layer, will create an artificial "star" at that altitude by pumping the sodium atoms struck by the beam to a higher energy level, with light being emitted as the atoms return to their prior energy state.

Telescopes have been developed with 32-inch mirrors made up of many tiny flexible segments, each controlled by computer so that they can be instantly adjusted to remove distortions caused by atmospheric turbulence. Focused on the laser-lit guide star, 60 miles up, the segments of the telescope mirror will shape themselves to view the guide star clearly through the intervening atmosphere. Then, when the guide star vanishes as the laser beam is turned off, the finely tuned telescope will view the celestial objects with the same compensation for atmospheric disturbances.

Dye lasers, tunable to the sodium $D_2$ line, and developed originally for research on anti-satellite weapons, have an average beam power of several kilowatts, sufficient to create an artificial guide star in the sodium layer. However, such lasers generate very short pulses, in the order of 60 nanoseconds, and with very high peak power, in the order of $10^{10}$ watts, and will essentially burn a hole through the sodium layer rather than causing the desired stimulated emission from the layer.

In order to make these lasers usable for creation of an artificial guide star it was necessary to find a way to reduce the peak power of the laser pulses without substantially reducing the average power in the laser beam.

SUMMARY OF THE INVENTION

It is the principal object of the invention to provide apparatus for lengthening the duration of laser pulses in a laser beam so as to reduce the peak power of the pulses without a substantial loss of average power in the beam.

Additional objects, advantages and novel features will be set forth in the description which follows, and in part will become apparent to those skilled in the art upon examination of the following, or may be learned by practice of the invention. The objects and advantages of the invention may be realized and attained by means of the instrumentalities and combinations pointed out in the appended claims.

To achieve the foregoing and other objects, and in accordance with the present invention, as described and broadly claimed herein, an apparatus for increasing the length of a laser pulse is provided having a means forming a plurality of optical delay paths of successively increasing delay times, with a laser pulse being directed simultaneously to the inputs of each of the optical delay paths and with the delayed pulses from the outputs of the optical delay paths being sequentially directed to the laser output of the apparatus.

A further aspect of the invention is that a White cell, with a field mirror and two objective mirrors is used to form the plurality of optical delay paths, there being a plurality of sets of inputs to and outputs from the cell, with each set providing for a progressively increasing number of passes of a laser pulse back and forth between the mirrors.

A still further aspect of the invention is that a beam splitter, with 50% reflectivity and 50% transmission is used in conjunction with the optical delay paths so that the peak power of all of the pulses directed to the laser output of the apparatus is substantially equalized.

BRIEF DESCRIPTION OF THE DRAWINGS

The accompanying drawings, which are incorporated in and form part of the application, together with the description, serve to explain the principles of the invention.

DESCRIPTION OF PREFERRED EMBODIMENTS

Figure 1:
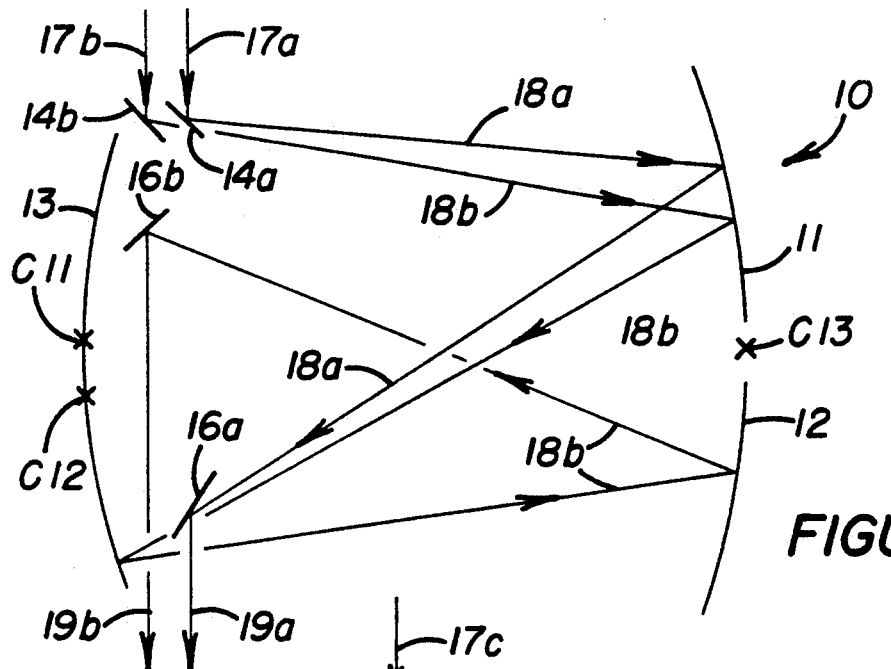
FIG. 1 is a diagrammatic plan view of a White cell with two sets of input and output mirrors arranged to provide two-pass and four-pass optical delay paths.
Figure 2:
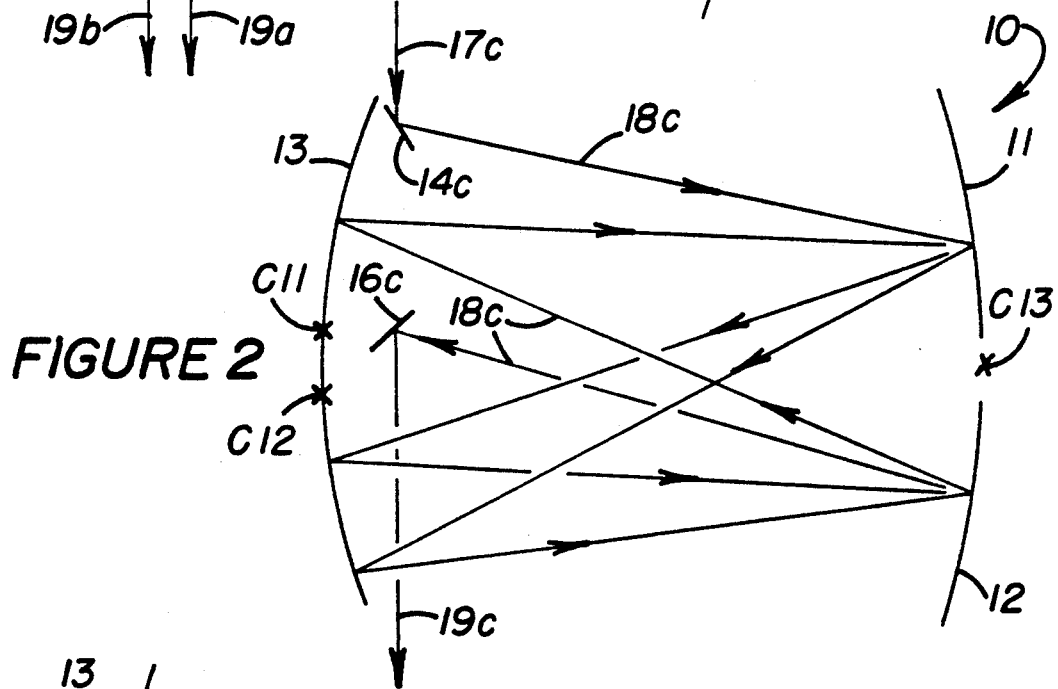
FIG. 2 is similar to FIG. 1, with a set of input and output mirrors arranged to provide an eight-pass optical delay path.
Figure 3:
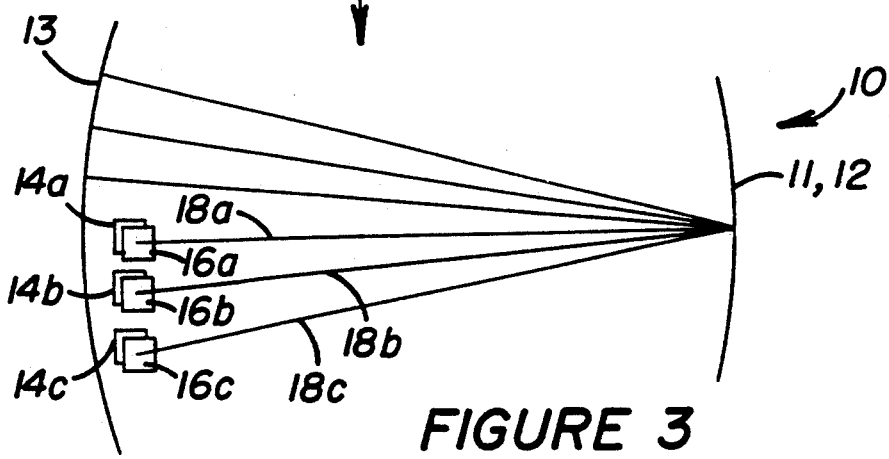
FIG. 3 is a diagrammatic elevational view of a White cell with the three optical delay paths of FIGS. 2 and 3.

Referring now to the drawings, wherein preferred embodiments of the invention are illustrated, FIGS. 1-3 are simplified drawings of a White cell 10 showing various optical delay paths in the cell. The basic White cell design was described by John W. White in an article entitled "Long Optical Paths of Large Aperture" appearing at page 285, Vol. 32 of the Journal of the Optical Society of America in May, 1942, and permits a beam to be folded many times in a relatively short cell with the main energy loss being due to mirror surface reflectivity. The original White cell had a minimum path length of four times the length of the cell. U.S. Pat. No. 3,726,598, issued on Apr. 10, 1973 to Anthony C. Gilbly and James A. Horton, discloses a variation of the White cell with a minimum path length of twice the physical length of the cell.

The basic White cell 10 uses three mirrors. A pair of spherical objective mirrors 11 and 12 is positioned at one end of the cell and a single spherical field mirror 13 is at the other end. All mirrors have the same radius of curvature and the separation of the field mirror from the objective mirrors is approximately equal to the radius of curvature. The centers of curvature of mirrors 11, 12, and 13 are indicated on FIGS. 1 and 2 by the "x's" C11, C12 and C13, respectively. An input mirror 14a positioned at one side of the field mirror and an output mirror 16a is positioned at the other side of the same mirror. With proper positioning of mirrors 14a and 16a, an incoming beam 17a incident on input mirror 14a will be reflected therefrom to follow a two-pass optical delay path 18a before it is incident on output mirror 16a and reflected therefrom as output beam 19a. Similarly, with proper positioning of input mirror 14b an incoming beam 17b will follow the optical delay path 18b and will travel back and forth between the field and objective mirrors four times before exiting as output beam 19b.

FIG. 2 shows a White cell with an input mirror 14c and an output mirror 16c positioned so that an input beam 17c will follow an eight-pass optical delay path 18c before exiting as output beam 19c.

FIG. 3 shows a side view of a White cell with the three sets of input and output mirrors, 14a-16a, 14b-16b and 14c-16c of FIGS. 1 and 2 in a single White cell 10. Additional sets of input and output mirrors can be positioned in the cell to provide other multi-pass optical delay paths.

Figure 4:
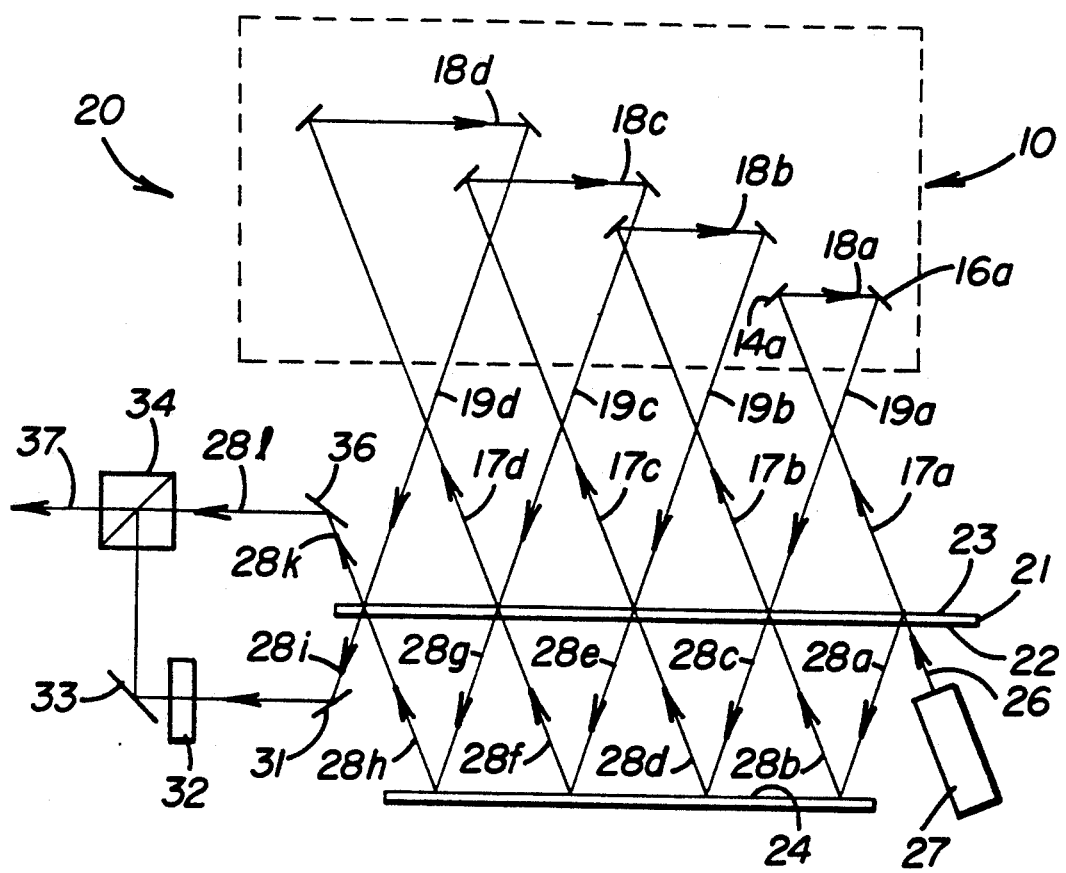
FIG. 4 is a diagrammatic view of an embodiment of the present invention, with four optical delay paths.

FIG. 4 is a diagrammatic illustration of an entire pulse stretching system 20 using a multipass optical system 10 having four optical delay paths 18a, 18b, 18c and 18d, of two-pass, four-pass, eight-pass and sixteen-pass lengths, respectively. The system 20 also includes an amplitude beam splitter 21 having first and second opposed surfaces 22 and 23. Beam splitter 21 will reflect a portion of a beam incident on either of its surfaces while transmitting the rest of the beam therethrough. Preferably beam splitter 21 is 50% reflective and 50% transmissive. A 100% reflecting mirror surface 24 is parallel to, spaced from and facing surface 22 of beam splitter 21.

A laser beam 26 from laser pulse generator 27 is directed at an angle to beam splitter 21, and half of the energy in each pulse will be reflected back from the beam splitter and will follow a multi-leg path 28a-28i back and forth between the beam splitter 21 and mirror 24. Each time the pulse in this path is reflected back from beam splitter 21 its energy will be reduced by one-half. Thus the energy, and peak power, of the pulse at leg 28i will be 1/32nd of the energy of the pulse from laser 27. Likewise, the energy of the pulse at path portion 28k will be 1/32nd of the energy of the pulse from laser 27. The pulse at path portion 28i is reflected by mirror 31 through polarization rotator 32 and then by mirror 33 to polarization combiner 34. The pulse at path portion 28k is reflected by mirror 36 to the polarization combiner 34, and the combined pulse at the laser output 37 of the system will have an energy, and peak power, of 1/16th of the energy of the pulse from laser 27. Since there are no time delays in the above described reflective path 28a-k, the first reduced-energy pulse will be contemporaneous with the pulse from laser 27.

The other half of the energy of the pulse from laser 27 will pass through beam splitter 21 and become the input beam 17a to the two-pass optical delay path 18a. Simultaneously, the pulse from laser 27 will follow paths 28a and 28b, and through beam splitter 21 to become input beam 17b to the four-pass optical delay path 18b. Likewise, as the pulse from laser 27 travels along the multi-leg path 28a-f it will pass through beam splitter 21 to the eight-pass input path 17c and the sixteen-pass delay paths 17d. Thus, during the generation of the pulse from laser 27, one-half of its energy will go to delay path 18a, one-fourth will go to delay path 18b, one-eighth will go to delay path 18c and one-sixteenth ill go to delay path 18d.

Half of the output pulse 19a from the two-pass delay 18a will be reflected back along path 17b to the four-pass delay 18b, while the other half will pass through beam splitter 21 for travel along the path 28c-k to output 37, and also for simultaneous injection through beam splitter 21 to the eight-pass and sixteen-pass delay paths 18c and 18d.

In like manner, pulses at the output of the four-pass delay 18b will go simultaneously to laser output 37 and to the inputs of the eight-pass and sixteen-pass delays 18c and 18d. Pulses from the output of the eight-pass delay 18c will go simultaneously to laser output 37 and the input to the sixteen-pass delay 18d. All pulses from the output of the sixteen-pass delay 18d go directly to laser output 37.

The delay time of the two-pass delay 18b is preferably not less than the time duration of the pulses from laser 27. Thus, if the pulses from laser 27 are of 60 ns length, the delay time of delay path 18a should be at least 60 ns. Light will travel approximately one foot in one nanosecond. Consequently, for a two-pass delay of 60 ns, the objective mirrors 11 and 12 should be approximately 30 feet from the field mirror 13. Greater spacing of the mirrors will result in increased delay time.

Figure 5:
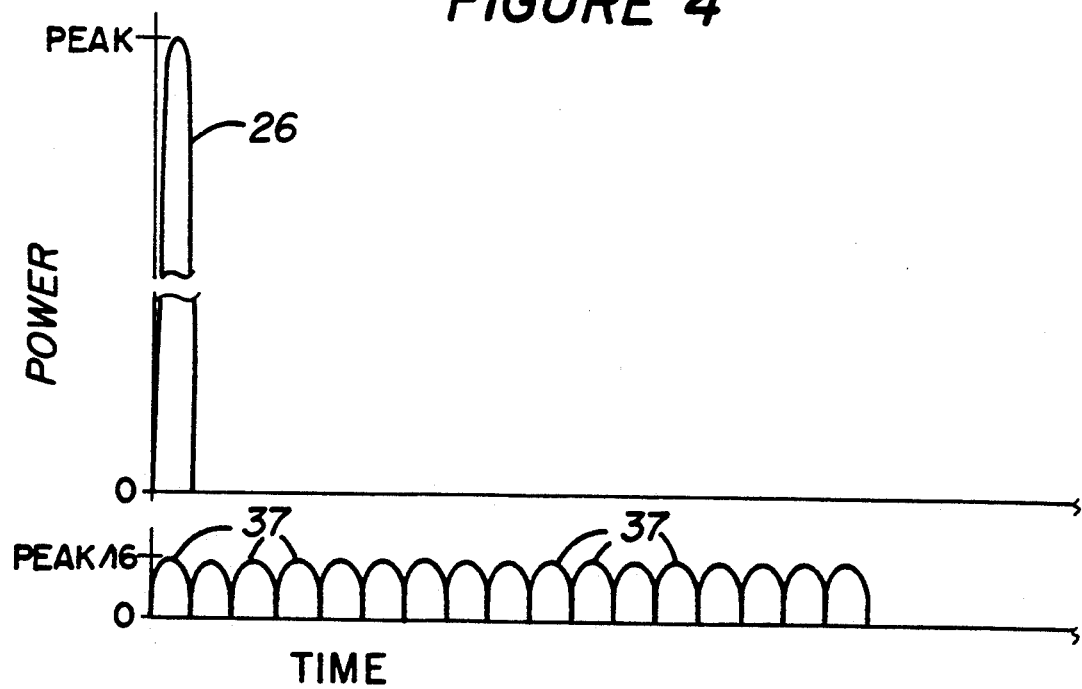
FIG. 5 illustrates the magnitude and time duration of the input laser pulse and the output laser pulses.

FIG. 5 illustrates the pulse from laser 27 and the pulses appearing at the laser output 37. As explained above, the first pulse at output 37 is not delayed. The second and third pulses will have gone only through the two-pass and four-pass delays 18a and 18b, respectively. The fourth pulse will have gone through both the two-pass and four-pass delay 18a and 18b, and so forth. The sixteenth pulse will have gone through all four optical delay paths. Since all of the pulses at output 37 will have either passed through or been reflected from beam splitter 21 a total of five times, the pulses will all have an equal amount of attenuation. Thus, with a 60 ns pulse from laser 27, the 16 pulses at output 37 will occur immediately after one another for a total time duration of 960 ns. The last output pulse will have made 30 passes in the four optical delay paths. With low loss mirrors 11, 12, 13 (0.998 reflectivity) the magnitude of the last output pulse will be $(0.998^{30})$, or 94% of the first output pulse.

Figure 6:
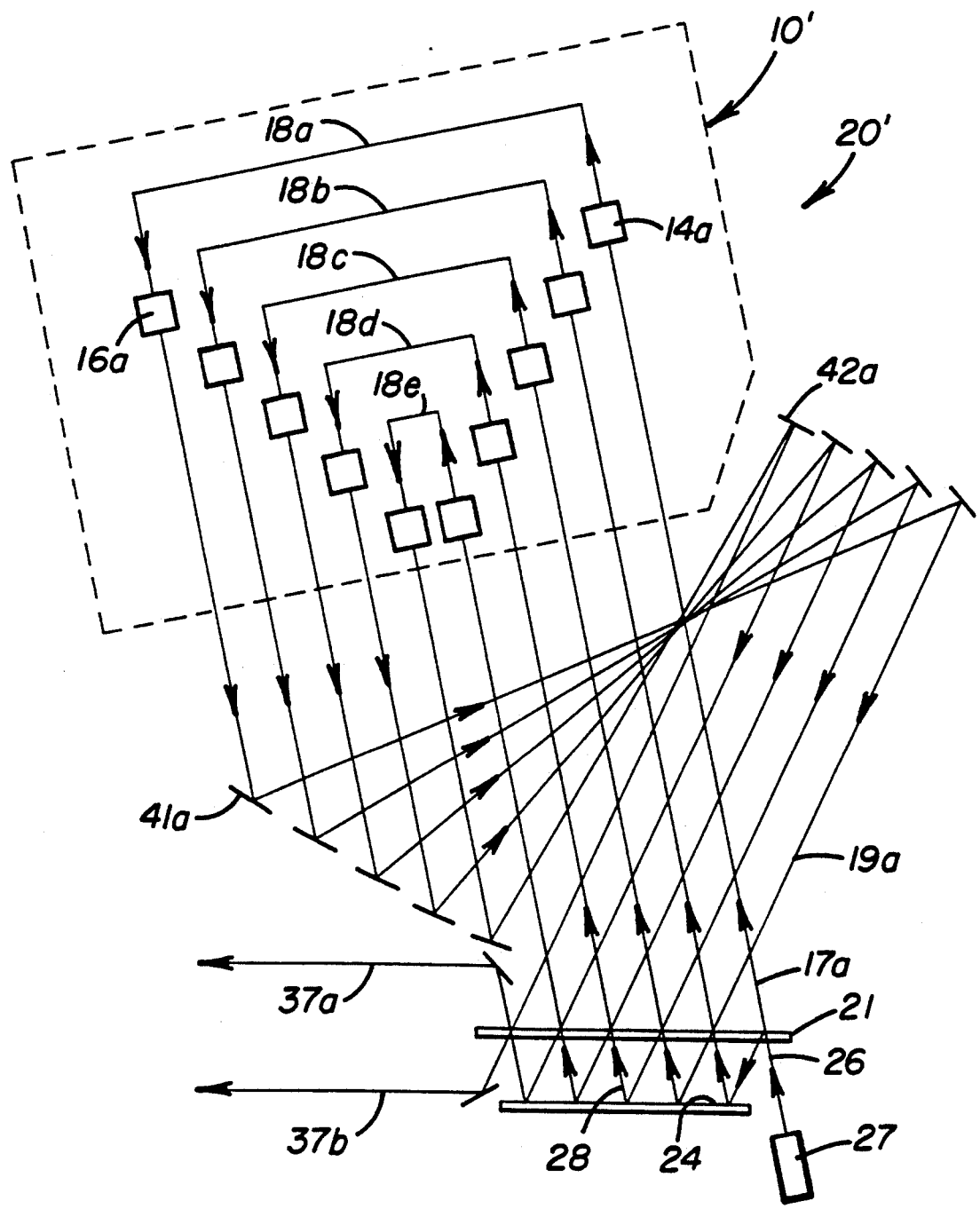
FIG. 6 illustrates another embodiment of the present invention, with five optical delay paths.

FIG. 6 illustrates another embodiment 20' of the invention, wherein the multipass optical system 10' has five optical delay paths 18a, 18b, 18c, 18d and 18e, of successively increasing delay times. As before, the pulse from laser 27 will travel a multi-leg reflective path 28 between beam splitter 21 and mirror 24 to both laser outputs 37a and 37b, with the pulse being attenuated by 50% each time it is reflected from beam splitter 21, and when it passes through the beam splitter to the laser output 37a. The pulse will be attenuated six times by the time it reaches laser output 37a and 37b, and will have 1/64th the energy and peak power of the pulse from laser 27. The laser beams at outputs 37a and 37b can be separately used, or the pulses may be combined as with the polarizers 32 and 34 of FIG. 4, if desired.

Also as before, the pulse from laser 27 is also transmitted simultaneously through beam splitter 21 to the five input mirrors, such as mirror 14a, of the multipass optical system. Pulses at the output mirrors, such as mirror 16a, will be reflected by focusing mirrors, such as mirrors 41a and 42a to the points on beam splitter 21 wherein the pulse will be reflected to the input mirror of the next longer optical delay path and will be transmitted through the beam splitter 21 to one of the legs of the reflective path 28.

If the delay time of delay path 18a is the same as the length of the pulse from laser 27, and if the delay times of the successive delay paths double each time, there will be thirty-two consecutive pulses at each output 37a and 37b. If the laser pulse from laser 27 is 60 ns, the total length of the output pulses will be 1920 ns.

If desired, the optical delay paths 18a-18e may provide 2, 4, 8, 16 and 32 passes, respectively. In such case, the 32nd output pulse will have been reflected 60 times by the objective and field mirrors 11, 12 and 13, and its magnitude will be 87% of the first output pulse.

If desired, the optical delay paths 18a-183 could provide 4, 8, 16, 32 and 64 passes, respectively. In such case the distance between the field and objective mirrors can be cut in half and still provide a time delay of the four-pass delay path 18a equal to the length of the pulse from laser 27. However, the number of reflections from the field and objective mirrors would double, reducing the magnitude of the 32nd output pulse to 78% of the first output pulse.

Also, if desired, the number of passes of the successive delay paths can increase by more than double the number of passes in the preceding path. For example, the number of passes of delay paths 18a-18e could be 2, 6, 10, 22 and 48. Such an arrangement would increase the time from the beginning of the first output pulse to the end of the last output pulse. This additional stretching of the pulse from laser 27 will cause short intervals to exist between successive output pulses, which may be desirable in particular applications.

If desired, the input mirror 14a and adjacent mirror 16a between the field and objective lenses of the White cell can be eliminated by providing the field mirror 13 with properly located openings or notches therethrough, and by repositioning the incoming beam 17a and output beam 19a so that the incoming beam 17a passes directly through the field mirror 13 to become the first leg of delay path 18a, with the last leg of delay path 18a passing directly through the field mirror to become the output beam 19a. Similarly, the field mirror may be apertured or notched so that some or all of the other incoming beams and output beams pass directly through the field mirror.

The foregoing description of the preferred embodiments has been presented for purposes of illustration and description. It is not intended to be exhaustive or to limit the invention to the precise form described, and obviously many other modifications are possible in light of the above teaching. The embodiments were chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

I claim:

1. Apparatus for increasing the length of a laser pulse, comprising:
    a) means forming a plurality of optical delay paths of successively increasing delay times, each optical delay path having an input and an output,
    b) means for generating a laser pulse of a predetermined time duration,
    c) a laser output,
    d) directing means for directing a portion of said generated laser pulse simultaneously to the inputs of all of said optical delay paths, and for directing a pulse from each of the outputs of said optical delay paths to said laser output so that one elongated laser pulse is formed by a plurality of sequential and adjacent laser pulses from the outputs of said optical delay paths.

2. Apparatus as set forth in claim 1, wherein said directing means includes beam splitting means for substantially equalizing the power of each pulse directed to said laser output from the outputs of said optical delay paths.

3. Apparatus as set forth in claim 1, wherein said directing means also functions to direct a portion of the pulse from the output of each optical delay path simultaneously to the inputs of all, if any, of said optical delay paths having longer delay time.

4. Apparatus as set forth in claim 3, wherein said directing means includes beam splitting means for substantially equalizing the power of each pulse directed to said laser output from the outputs of said optical delay paths.

5. Apparatus as set forth in claim 3, wherein the delay time of the shortest optical delay path is not less than said predetermined time duration, and wherein each successive optical delay path has a delay time of at least twice the delay time of the preceding optical delay path.

6. Apparatus as set forth in claim 5, wherein said directing means includes beam splitting means for substantially equalizing the power of each pulse directed to said laser output from the outputs of said optical delay paths.

7. Apparatus for increasing the length of a laser pulse, comprising:
    a beam splitter having first and second opposed surfaces and functioning to reflect a portion of a beam incident on either of said surfaces while transmitting the rest of said beam therethrough,
    a reflecting surface spaced from and facing said first surface of said beam splitter,
    means for generating and directing a laser pulse towards a point on beam splitter and positioned relative to said beam splitter such that said pulse is repeatedly reflected through a multi-leg path back and forth between said beam splitter and said reflecting surface with said pulse being reflected back to successive points on said first surface of said beam splitter,
    a multipass optical system spaced from said second surface of said beam splitter, said multipass optical system having a field mirror and two objective mirrors spaced from each other and a plurality of sets of inputs and outputs, each set functioning to cause a pulse at the input of the set to be reflected back and forth between said field and objective mirrors and then to the output of the set, said sets of inputs and outputs being arranged relative to said mirrors such that for each successive set there is a progressively increasing number of passes of a pulse back and forth between said mirrors,
    said multipass optical system being disposed relative to said beam splitter such that a laser pulse incident on said first surface of said beam splitter at said first and successive points will be transmitted through said beam splitter to successive inputs of said multipass optical system, means for directing a pulse from each output of said multipass optical system towards a point on said second surface of said beam splitter for reflection therefrom to the next successive input of said multipass optical system and for transmission through said beam splitter to one of the legs of said multi-leg path.

8. Apparatus as set forth in claim 7, wherein said beam splitter is 50% reflective and 50% transmissive.

9. Apparatus as set forth in claim 7, wherein the time for a laser pulse to pas back and forth between said mirrors from the input to the output of the set with the least number of passes is not less than the time duration of said laser pulse, and wherein the number of passes between said mirrors for each successive set is at least twice the number of passes for the preceding set.

10. Apparatus as set forth in claim 9, wherein said beam splitter is 50% reflective and 50% transmissive.

* * * * *